Oct. 12, 1965 A. FERRARI 3,211,645

METHOD AND APPARATUS FOR FILTERING SANGUINEOUS LIQUID STREAMS

Filed July 17, 1962

INVENTOR.
ANDRES FERRARI
BY Harry Cohn
ATTORNEY

United States Patent Office 3,211,645
Patented Oct. 12, 1965

3,211,645
METHOD AND APPARATUS FOR FILTERING SANGUINEOUS LIQUID STREAMS
Andres Ferrari, Scarsdale, N.Y., assignor to Technicon Instruments Corporation, Chauncey, N.Y., a corporation of New York
Filed July 17, 1962, Ser. No. 210,493
13 Claims. (Cl. 210—22)

This invention relates to the filtering of liquid streams, such as a stream of sanguineous liquid and, more particularly, to ultrafiltration of such streams.

One object of the present invention is to provide a method and apparatus for the continuous filtering of a liquid stream in a relatively simple and inexpensive manner which prevents the collection of non-filterable substances in the liquid passage of the filter from the liquid which is flowing through said passage, whereby contamination of a portion of the stream due to the collection of non-filterable substances from a preceding portion of the stream is prevented.

Another object is the provision of a filter having liquid passages arranged to permit easy flow of the liquid stream through the filter without clogging and which prevent mixing of successive portions of the filtrate stream which is formed during the filtering operation.

Another object is to provide a filter apparatus with means to maintain the filter material in a moist condition during the filtering operation to prolong the life of said material.

A further object is generally to provide an improved method of filtering and filter apparatus of improved construction.

The above and other objects, features and advantages of the invention will be more fully understood from the following description of the invention considered in connection with the accompanying illustrative drawings of the presently preferred embodiment of the invention.

Figure 1:
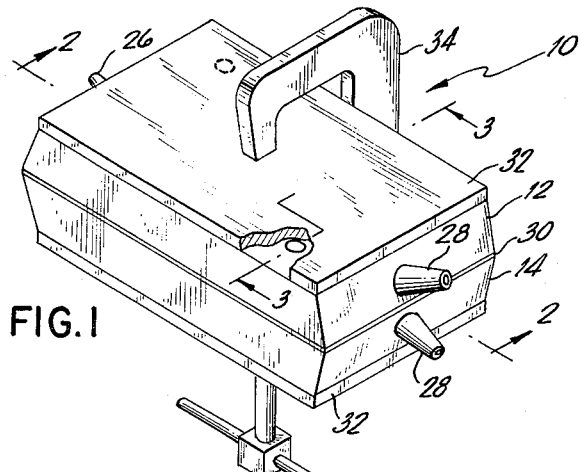
FIG. 1 is a perspective view of a filter apparatus in accordance with the present invention.
Figure 3:
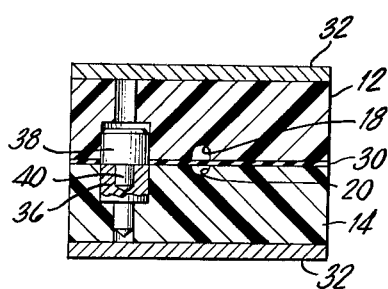
FIG. 3 is a sectional view, on a larger scale, taken on line 3—3 of FIG. 1.
Figure 2:
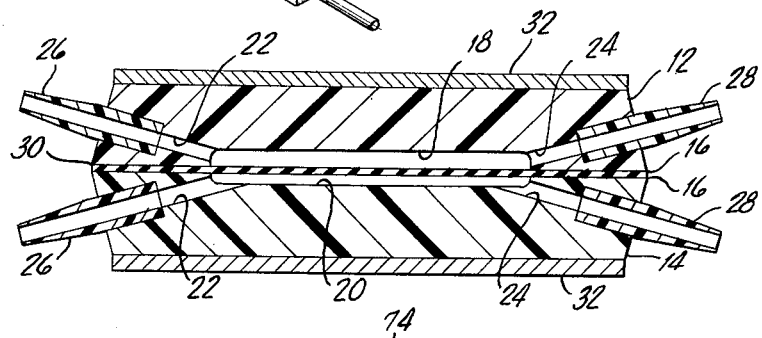
FIG. 2 is a sectional view, on a larger scale, taken on line 2—2 of FIG. 1.

Referring now to the drawings in detail, the filter 10 comprises companion plate members 12 and 14, herein illustrated as rectangular in shape, made of a suitable plastic material which is preferably transparent, for example a plastic sold under the trademark "Lucite." The members have flat surfaces 16 which are arranged in confronting face-to-face relation. The surface of member 12 is provided with a longitudinally extending groove 18 and the surface of member 16 is provided with a longitudinally extending groove 20 which is in registry with groove 18 and is coextensive in length therewith. A liquid inlet passage 22 is provided in member 12 in communication with one end of groove 18 and a liquid outlet passage 24 is provided in member 12 in communication with the groove at its opposite end. Similarly, member 14 is provided with liquid inlet and outlet passages 22 and 24 which are positioned at the opposite ends, respectively, of groove 20. Inlet nipples 26 are provided for inlet passages 22 and outlet nipples 28 are provided for outlet passages 24 so that tubes can be connected to the filter for the transmission of liquids to and from the filter.

A layer of a suitable filter material 30, for example cellulose or very dense filter paper, is interposed between the confronting surfaces 16 of the plate members to form, with grooves 18 and 20, confronting liquid passages at the opposite sides, respectively, of the filter material. A pair of rigid metal plates 32 cover the outer faces of the plate members and a C-clamp 34 clamps the plates 32, plate members 12 and 14, and filter layer 30 together with the filter layer held in fluid tight relation between the confronting surfaces of the plate members. For aligning the grooves with respect to each other, plate member 14 is provided with a pair of socket pins 36 which are positioned at opposite corners of the member and plate member 12 is provided with a pair of pins 38, at opposite corners of the member. Pins 38 have shanks 40 which extend into the sockets of the companion socket pins 36. It is to be noted that the metal plates 32 distribute the clamping pressure of the C-clamp over the faces of the plate members so that the pressure is distributed evenly over the opposite faces of the filter layer.

According to one feature of the invention, the groove or passage 18 for the sample liquid stream which is to be filtered, has a cross-sectional area and length in relation to the volumetric rate of flow of the sample stream through said passage such that the collection of substances in said passage and on said filter material from the sample liquid flowing through said passage is prevented, whereby clogging of the passage and the filter material and contamination of one portion of the liquid stream due to the collection of substances from a preceding portion of the stream is obviated. This is especially important in the use of the filter for studies with respect to blood and for other studies in connection with blood and blood analysis. In such studies, a series of separate blood samples are transmitted in the form of a stream and each of the samples may be treated with one or more reagents, in a continuous manner to determine the effect of the reagent on the blood samples or for some other purposes. In such a sanguineous treatment or analysis system, it is necessary to filter the treated sample stream to remove or separate one or more constituents, or a portion thereof, of the sample stream. The filter of the present invention is especially well adapted for accomplishing the necessary filtration of the sample stream in a manner whereby the necessary quantity of filtrate is quickly provided and without any contamination of one sample by substances from a preceding sample which might deposit on the walls or filter material of the passage through which the sample stream flows for the filtering operation.

I have discovered that the collection of non-filterable substances in groove 18 and on the filter material 30 at the sample side of the filter from the liquid stream which is being filtered is prevented by transmitting the liquid stream through groove 18 at a volumetric rate of flow which is not less than about 40 to 60 times the volume of groove 18 per minute. Optimum results are obtained when the rate of flow is about 50 times the volume of groove 18. For example, in determining blood types with the apparatus illustrated by FIG. 4, good filtering was obtained and with no contamination, with a broove 18, 1.1" long, 0.062" wide, and 0.040" deep, to form a volume of 0.040 cc. The rate of flow of the sample stream through the groove was 2.0 cc. per minute. It will be understood that the foregoing dimensions are examples only and may be varied in a manner so that the rate of flow of the sample stream is about 40 to 60 times the volume of groove 18 per minute. The flow rate can be higher than 60 times the volume of groove 18 per minute, but the higher flow rates result in higher pressures of the sample stream against the filter material which might rupture the material if the pressures become excessive.

Figure 4:
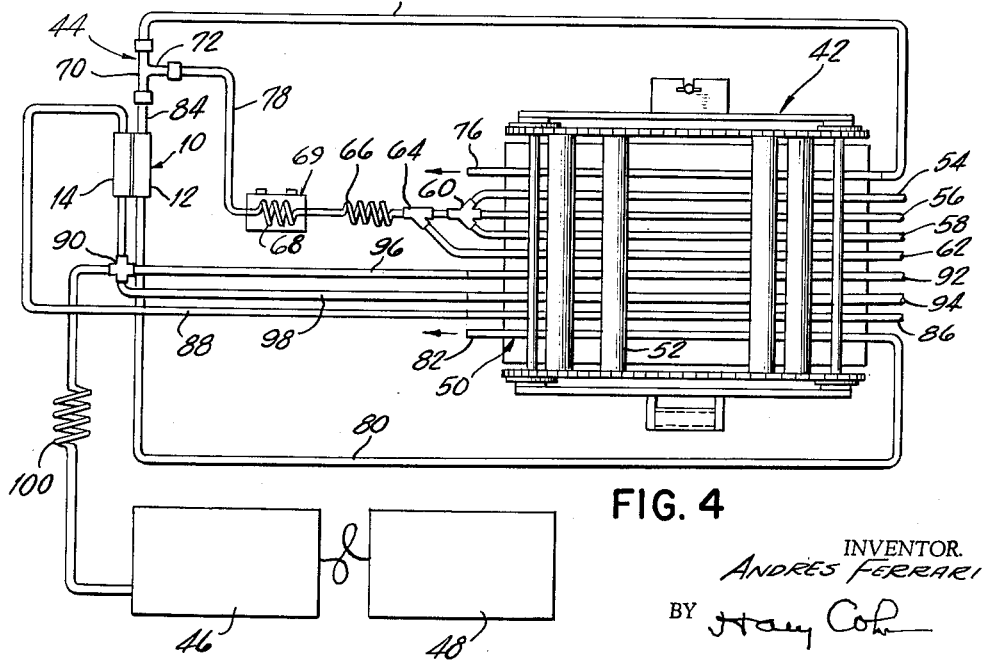
FIG. 4 is a more-or-less diagrammatic illustration of a method and apparatus according to the present invention.

I have further discovered that the prevention of the collection of cotaminants in groove 18 and on the filter material is further aided by positioning the filter in a vertical direction, as illustrated by FIG. 4, so that the contaminants can more readily flow down and out of groove 18.

The rate at which the filtrate passes through the membrane 30 of the filter is controlled by the rate of transmission of the sample liquid into groove 18 and of the filtered liquid from the groove. More particularly, the filtered liquid is transmitted from groove 18 at a rate of flow which is lower than the rate of flow of the sample stream into groove 18 to effect a filtering rate which is equal to the difference between the rates of flow of the liquid into and out of groove 18. The difference in flow rates creates a pressure on the filter layer 30 to force the filtrate through the pores of the filter layer at a rate which is equal to the difference between the flow rates of the sample stream into and out of the groove. In this manner, a relatively large quantity of filtrate can be provided in a relatively short period of time and with a relatively short length of filtering passage 18. The different rates of flow of the sample stream into and out of the filter can be controlled by a proportioning pump, such as pump 42 illustrated in FIG. 4.

In accordance with another feature of the invention, groove 20 on the recipient side of the filter is not as deep as groove 18 to form a cross sectional area which is smaller than the cross sectional area of groove 18. In the present example illustrated by FIG. 4, the depth of groove 20 was 0.031" whereas the depth of groove 18 was 0.040". The smaller recipient groove 20 permits the use of lesser amounts of reagents which form the recipient stream. Furthermore, a smaller recipient stream for the filtrate prevents mixing of successive portions of filtrate since the smaller recipient stream carries away the filtrate before a succeeding portion of the filtrate has an opportunity to pass into the recipient stream and mix with the preceding filtrate portion. Even without a recipient stream, the smaller groove 20 permits the formation of a filtrate stream on the recipient side of the filter which prevents mixing of successive portions of filtrate. Preferably, the rate of flow of the recipient stream is about 60 times the volume of groove 20 per minute, although it will be understood that the flow rate is not critical.

Referring now to FIG. 4, there is shown an apparatus for determining the effect of an Anti-Sera on a series of separate blood samples for determining blood types, and which utilizes the filter 10 of the present invention. Briefly described, the apparatus comprises the proportioning pump 42, a gas separating device 44, the filter 10, a colorimeter 46 of the continuous flow type, and a recorder 48 operable under the control of the colorimeter for providing a record of the results of the treatment of the blood with an Anti-Sera. Pump 42 is preferably of the type shown in U.S. Patent No. 2,935,028 issued May 3, 1960, and comprises a series of resiliently flexible pump tubes 50 which are simultaneously compressed by a series of longitudinally moving compressing rollers 52 so that different fluids, in relative predetermined proportions, are separately and concurrently pumped through the different pump tubes at the same linear rate of flow.

A series of separate blood samples are supplied to pump tube 54 from a suitable sample supply device (not shown), as for example the device shown in U.S. Patent No. 3,038,340 issued June 12, 1962. The samples are in the form of a stream and each sample is separated from the adjacent sample by an intervening air segment, as described in said U.S. patent. An Anti-Sera whose effect on the blood samples is to be determined, is supplied to pump tube 56 and a 0.9% solution of sodium chloride is supplied to pump tube 58 to prevent self-hemolysis of the blood samples. The different fluid streams join each other in fitting 60 and segmentizing air, which is supplied through pump tube 62, is introduced into the resulting stream at fitting 64 to divide the stream into a series of spaced liquid segments which are separated from each other by intervening segments of air, as explained in U.S. Patent No. 2,797,149 issued June 25, 1957. The segmentizing air helps keep the tubular passages of the apparatus clean so that contamination of one portion of the stream due to deposits of substances from a preceding portion of the stream is prevented.

The segmentized stream is transmitted through a horizontal helical mixing coil 66 where the constituents of each liquid segment are mixed together and the resulting stream is transmitted to a coil 68 which is immersed in a heating bath 69. From the heating bath, the segmentized stream is transmitted to the previously mentioned gas separating device 44 which removes the gas segments from the stream to form a consolidated liquid stream that is transmitted to the filter 10 for the filtering operation.

The gas separating device comprises a vertical tubular passage 70 and a horizontal inlet passage 72 which is in fluid flow communication with passage 70 at a point intermediate the ends of the latter. The upper end of passage 70 has a suction tube 74 connected thereto and to a pump tube 76. The inlet passage 72 is connected to the outlet of coil 68 by a conduit 78. It will be apparent that as the segmented stream flows into passage 70 from the heating bath, the gas segments of the stream rise through the vertical passage 70 and the suction action of tubes 74 and 76 aids in the dislodgment of the gas segments from the stream. The resulting liquid segments of the stream are consolidated in the lower part of passage 70 and flow downwardly through said part to form a consolidated liquid stream which is transmitted to the vertical filter 10. The consolidated liquid stream maintains the filter layer 30 moist during the filtering, thus prolonging the life of the filter layer. The removal of the gas segments from the stream eliminates the drying effect of the gas segments on the filter layer which might shorten its life.

The consolidated liquid stream which is to be filtered passes downwardly through groove 18 and from the filter through a conduit 80 which is connected to pump tube 82. The internal diameter of conduit 80 is less than the internal diameter of conduit 84 which connects the outlet of the separator 44 to the inlet nipple 26 at the sample side of the filter. Due to the difference between the internal diameters of conduits 84 and 80, the filtrate passes through the pores of the filter layer 30 at a rate which is dependent on said internal diameters, as indicated above, whereby the rate of filtration is controlled and is not merely dependent on the sizes of the pores of the filter layer.

Concurrently with the flow of the sample stream through the sample side of the filter, a recipient stream is transmitted through the recipient side of the filter for receiving the filtrate. In the present illustrative example, the recipient stream is water which is introduced through pump tube 86 and is transmitted to the recipient side of the filter through conduit 88 which is connected to inlet nipple 26 at the recipient side of the filter. The recipient stream containing the filtrate is transmitted from the filter to a fitting 90 where it joins a stream of air introduced through pump tube 92 and a stream of a 1 N. solution of ammonia which is introduced through pump tube 94. The ammonia dissolves any proteinaceous material which might be present in the recipient stream, as well as help keep the tubular passages of the apparatus clean. The ammonia and air streams are transmitted from their respective pump tubes to fitting 90 through conduits 96 and 98, respectively. The resulting stream is transmitted from fitting 90 through a horizontal helical mixing coil 100 and from the latter through colorimeter 46 which colorimetrically examines the stream to determine its hemoglobin content, and the results of the examination are recorded on recorder 48. The quantity of the hemoglobin in the stream identifies the blood types of the samples and permits quantitation of the reaction, i.e., determinations of the degree of agglutination.

As is well understood, the addition of an Anti-Sera to the blood samples results in the formation of agglutinates of red blood cells. The addition of an antigen results in either the formation of a precipitate in serum or hemolysis of the red blood cells of the samples, depending upon the type of antigen used. The pore sizes of the filter layer 30 are selected so that the unhemolyzed cells are retained on the sample side of the filter, in the case of hemolysis, and in the case of agglutination, the pore sizes are selected so that the agglutinated cells remain on the sample side of the filter. Similarly, in the case of precipitation, the pore sizes are selected to prevent passage of the antigen precipitate into the recipient stream. The degree of hemolysis and agglutination is determined by the quantity of hemoglobin which passes through the filter layer as a filtrate and the quantity of the hemoglobin is an indication of the effect of either the Anti-Sera or antigen on the blood samples. In the case of precipitation, the quantity of the unprecipitated antigen which passes through the filter layer into the recipient stream is an indication of the effect of the antigen on the blood samples. This quantity can be determined by treating the recipient stream with a stream containing the Biuret reagent for protein determinations, and it will be apparent that the filter can be used in connection with the analysis of blood with respect to its protein content. In the case of agglutination or precipitation, the pore sizes can vary from about 7 to 9 microns while in the case of hemolysis, the pore sizes can be 2 or 3 microns or less in diameter. As the phenomena of precipitation, hemolysis and agglutination are well known in sanguineous reactions and do not, per se, form part of the present invention, further discussion of the immuno-chemical reactions of the example illustrated by FIG. 4 is considered unnecessary.

It is to be noted that the above mentioned sample supply device shown in U.S. Patent No. 3,038,340 provides a series of separate spaced samples, in the form of a stream, to the filter 10 due to the intermittent operation of the supply device, while the continuous operation of the pump 42 supplies a continuous reagent stream to the sample stream. As a result, the consolidated liquid stream supplied to the filter consists of a series of longitudinally spaced reagent treated liquid samples separated from each other by intervening segments of reagent liquid which act as a wash liquid in filter passage 18 between samples and remove any deposits of substances from a preceding sample to prevent contamination of a succeeding sample. As indicated above, the cross sectional area and length of groove 18 are sufficiently small to provide a volume such that the flowing wash liquid between samples is effective to prevent collection of deposited substances from preceding samples.

It will be understood that it is within the scope of the invention to omit the inlet nipple 26 and inlet passage 22 on the recipient side of the filter in those cases of filtering where a recipient stream is not necessary, as for example in the analysis of boiler feed water. In such a case, the rate of flow of the filtrate through outlet nipple 28 on the recipient side of the filter is selected so that groove 20 is always filled with filtrate to insure that a consolidated liquid stream is transmitted from the filter.

This application is related to my copending application Serial No. 853,488, now Patent No. 3,131,143, issued April 28, 1964, and assigned to the assignee of my present application.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. Sanguineous filter apparatus, comprising first and second companion plate members each having a surface provided with a groove therein, means mounting said members with said surfaces in confronting face-to-face relation and with said grooves in registry with each other, said groove in said first member having a liquid inlet and a liquid outlet and said groove in said second member having a liquid outlet, a layer of filter material interposed between said surfaces for the passage through said filter material of filterable substances in a liquid from said groove of said first member into said groove of said second member, and means in liquid flow communication with said inlet for transmitting a sanguineous liquid stream through said groove of said first member at a predetermined volumetric rate of flow, said groove of said first member having a cross sectional area and length to provide a given volume, the volumetric rate of flow being at least about forty times the given volume per minute whereby the collection of any non-filterable substances in said groove of said first member and on said filter material from the liquid flowing through said groove of said first member is prevented.

2. Sanguineous filter apparatus, comprising first and second companion plate members each having a surface provided with a longitudinally extending groove therein, means mounting said members with said surfaces vertical and in confronting face-to-face relation and with said grooves extending in a vertical direction in registry with each other, said groove in said first member having a liquid inlet and a liquid outlet and said groove in said second member having a liquid outlet, a layer of filter material interposed between said surfaces to form, with said grooves, confronting liquid passages at opposite sides, respectively, of said filter material for the passage through said filter material of filterable substances in a liquid from said groove of said first member into said groove of said second member, and means in liquid flow communication with said inlet for transmitting a sanguineous liquid stream through said groove of said first member at a predetermined volumetric rate of flow, said groove of said first member having a cross sectional area and length to provide a given volume, the volumetric rate of flow being at least about forty times the given volume per minute, whereby the collection of any non-filterable substances in said groove of said first member and on said filter material from said liquid flowing through said groove of said first member is prevented.

3. Sanguineous filter apparatus, comprising first and second companion plate members each having a surface provided with a groove therein, means mounting said members with said surfaces in confronting face-to-face relation and with said grooves in registry with each other, said groove in said first member having a liquid inlet and a liquid outlet and said groove in said second member having a liquid outlet, a layer of filter material interposed between said surfaces to form, with said grooves, confronting liquid passages at opposite sides, respectively, of said filter material for the passage through said filter material of filterable substances in a liquid from said groove of said first member into said groove of said second member, and means in liquid flow communication with said inlet for transmitting a sanguineous liquid stream through said groove of said first member at a predetermined volumetric rate of flow, said groove of said first member having a cross sectional area and length to provide a given volume, the volumetric rate of flow being at least about forty times the given volume per minute, whereby the collection of any non-filterable substances in said groove of said first member and on said filter material from the liquid flowing through said groove of said first member is prevented, and said cross sectional area of said groove of said first member being greater than the cross sectional area of said groove of said second member.

4. Sanguineous filter apparatus, comprising first and second companion plate members each having a surface provided with a longitudinally extending groove therein, means mounting said members with said surfaces vertical and in confronting face-to-face relation and with said grooves extending in a vertical direction in registry with each other, said groove in said first member having a liquid inlet and a liquid outlet and said groove in said second member having a liquid outlet, a layer of filter material interposed between said surfaces to form, with said grooves, confronting liquid passages at opposite sides, respectively, of said filter material for the passage through said filter material of filterable substances in a liquid from said groove of said first member into said groove of said second member, and means in liquid flow communication with said inlet for transmitting a sanguineous liquid stream through said groove of first said member at a predetermined volumetric rate of flow, said groove of said first member having a cross sectional area and length to provide a given volume, the volumetric rate of flow being at least about forty times the given volume per minute, whereby the collection of any non-filterable substances in said groove of said first member and on said filter material from the liquid flowing through said groove of said first member is prevented, and said cross sectional area of said groove of said first member being greater than the cross sectional area of said groove of said second member.

5. Sanguineous filter apparatus, comprising first and second companion plate members each having a surface provided with a groove therein, means mounting said members with said surfaces in confronting face-to-face relation and with said grooves in registry with each other, said groove in said first members having a liquid inlet and a liquid outlet and said groove in said second member having a liquid outlet, a layer of filter material interposed between said surfaces to form, with said grooves, confronting liquid passages at opposite sides, respectively, of said filter material for the passage through said filter material of filterable substances in a liquid from said groove of said first member into said groove of said second member, and pump means in liquid flow communication with said inlet and said outlet of said first member for effecting the withdrawal of serological liquid from said groove of said first member at a volumetric rate of flow which is lower than the volumetric rate of flow of sanguineous liquid into said groove of said first member, whereby to effect filtering of said liquid under pressure at a predetermined rate, said groove of said first member having a cross sectional area and length to provide a given volume, the withdrawal volumetric rate of flow being at least about forty times the given volume per minute, whereby the collection of any non-filterable substances in said groove of said first member and on said filter material from the liquid is prevented.

6. Sanguineous filter apparatus, comprising first and second companion plate members each having a surface provided with a longitudinally extending groove therein, means mounting said members with said surfaces vertical and in confronting face-to-face relation and with said grooves extending in a vertical direction in registry with each other, said groove in said first member having a liquid inlet and a liquid outlet and said groove in said second member having a liquid outlet, a layer of filter material interposed between said surfaces to form, with said grooves, confronting liquid passages at opposite sides, respectively, of said filter material for the passage through said filter material of filterable substances in a liquid from said groove of said first member into said groove of said second member, and pump means in liquid flow communication with said inlet and said outlet of said first member for effecting the withdrawal of sanguineous liquid from said groove of said first member at a volumetric rate of flow which is lower than the volumetric rate of flow of sanguineous liquid into said groove of said first member, whereby to effect filtering of said liquid under pressure at a predetermined rate, said groove of said first member having a cross sectional area and length to provide a given volume, the withdrawal volumetric rate of flow being at least about forty times the given volume per minute, whereby the collection of any non-filterable substances in said groove of said first member and on said filter material from the liquid is prevented.

7. Sanguineous filter apparatus, comprising first and second companion plate members each having a surface provided with a longitudinally extending groove therein, means mounting said members with said surfaces vertical and in confronting face-to-face relation and with said grooves extending in a vertical direction in registry with each other, said groove in said first member having a liquid inlet and a liquid outlet and said groove in said second member having a liquid outlet, a layer of filter material interposed between said surfaces to form, with said grooves, confronting liquid passages at opposite sides, respectively, of said filter material for the passage through said filter material of filtrable substances in a liquid from said groove of said first member into said groove of said second member, and pump means in liquid flow communication with said inlet and said outlet of said first member for effecting the withdrawal of sanguineous liquid from said groove of said first member at a volumetric rate of flow which is lower than the volumetric rate of flow of sanguineous liquid into said groove of said first member, whereby to effect filtering of said metric rate of flow of sanguineous liquid into said groove of said first said member having a cross sectional area and length to provide a given volume, the withdrawal volumetric rate of flow being at least about forty times the given volume per minute, whereby the collection of any non-filterable substances in said one groove of said first member and on said filter material from the liquid is prevented, and said cross sectional area of said groove of said first member being greater than the cross sectional area of said groove of said second member.

8. Sanguineous filter apparatus for the filtering of a stream comprising a series of longitudinally spaced sanguineous sample liquid segments separated from each other by intervening segments of a wash liquid, said apparatus comprising first and second companion plate members each having a surface provided with a groove therein, means mounting said members with said surfaces in confronting face-to-face relation and with said grooves in registry with each other, said groove in said first member having a liquid inlet and a liquid outlet and said groove in said second member having a liquid outlet, and a layer of filter material interposed between said surfaces to form, with said grooves, confronting liquid passages at opposite sides, respectively, of said filter material for the passage through said filter material of filterable substances in the sample segments from said groove of said first member into said groove of said second member, said groove of said first member having a cross sectional area and length to provide a given volume, the volumetric rate of flow of the stream being at least about forty times the given volume per minute, whereby the intervening wash liquid removes all substances which have been deposited from the sample segments on said filter material in said groove of said first member during the passage of the sample segments through said groove of said first member, so that contamination of a sample segment by deposited substances from preceding sample segments is prevented.

9. Sanguineous filter apparatus for the filtering of a stream comprising a series of longitudinally spaced sanguineous sample liquid segments separated from each other by intervening segments of a wash liquid, said apparatus comprising first and second companion plate members each having a surface provided with a longitudinally extending groove therein, means mounting said members with said surfaces vertical and in confronting face-to-face relation and with said grooves extending in a vertical direction in registry with each other, said groove in said first member having a liquid inlet and a liquid outlet and said groove in said second member having a liquid outlet, and a layer of filter material interposed between said surfaces to form, with said grooves, confronting liquid passages at opposite sides, respectively, of said filter material for the passage through said filter material of filtrable substances in the sample segments from said groove of said first member into said groove of said second member, said groove of said first member having a cross sectional area and length to provide a given volume, the volumetric rate of flow of the stream being at least about forty times the given volume per minute, whereby the intervening wash liquid removes any substances which have been deposited from said sample segments on said filter material in said groove of said first member during the passage of said sample segments through said groove of said first member, so that contamination of a sample segment by deposited substances from preceding sample segments is prevented.

10. Sanguineous filter apparatus for the filtering of a stream comprising a series of longitudinally spaced sanguineous sample liquid segments separated from each other by intervening segments of a wash liquid, said apparatus comprising first and second companion plate members each having a surface provided with a groove therein, means mounting said members with said surfaces in confronting face-to-face relation and with said grooves in registry with each other, said groove in said first member having a liquid inlet and a liquid outlet and said groove in said second member having a liquid outlet, and a layer of filter material interposed between said surfaces to form with said grooves, confronting liquid passages at opposite sides, respectively, of said filtering material for the passage through said filter material of filtrable substances in the sample segments from said groove of said first member into said groove of said second member, said one groove having a cross sectional area and length to provide a given volume, the volumetric rate of flow of the stream being at least about forty times the given volume per minute, whereby the intervening wash liquid removes all substances which have been deposited from said sample segments on said filter material in said groove of said first member during the passage of said sample segments through said groove of said first member, so that contamination of a sample segment by deposited substances from preceding samples is prevented, said cross sectional area of said groove of said first member being greater than the cross sectional area of said groove of said second member.

11. A method of sanguineous filtration according to which there is provided a filter comprising a layer of filter material having liquid passages at opposite sides of said filter material, said method comprising pumping a stream of sanguineous liquid to be filtered to one of said passages at one volumetric rate of flow, pumping the filtered liquid from said one passage at a volumetric rate of flow which is lower than said one rate of flow to effect a rate of filtration which is equal to the difference in the rates of flow of the liquid into and out of said one passage, and controlling said rates of flow into and out of said one passage so that the liquid flows through said one passage a volumetric rate of flow which is not less than about 40 times the volume of said one passage per minute, whereby the collection of non-filterable substances in said one passage from said liquid is prevented.

12. Sanguineous separation apparatus comprising:
 a first and a second fluid passageway having a common septum;
 said septum including a porous material for the passage therethrough of parts of a sanguineous fluid from said first passageway to said second passageway;
 said first passageway having a cross-sectional area and a length to provide a given volume; and
 a source of sanguineous fluid coupled to said first passageway for passing a fluid therethrough at a volumetric rate of flow between about forty to sixty times said given volume per minute.

13. Sanguineous separation apparatus comprising:
 a first fluid passageway and a second passageway having a common septum;
 said septum including a porous material for the passage therethrough of parts of a sanguineous fluid from said first passageway to said second passageway;
 a source of sanguineous fluid coupled to said first passageway for passing a sanguineous fluid therethrough;
 a source of recipient fluid coupled to said second passageway for passing a recipient fluid therethrough;
 the cross-sectional area of said second passageway being about three-fourths the cross-sectional area of said first passageway.

References Cited by the Examiner

UNITED STATES PATENTS

| 1,868,955 | 7/32 | Tachikawa | 210—22 |
| 2,797,149 | 6/57 | Skeggs | 23—230 |
| 3,109,714 | 11/63 | Skeggs | 23—253 |
| 3,116,118 | 12/63 | Whitehead et al. | 23—253 |

FOREIGN PATENTS 233,836 5/61 Australia.

MORRIS O. WOLK, *Primary Examiner.*